United States Patent [19]

Rose

[11] 4,419,041
[45] Dec. 6, 1983

[54] SPACIAL MECHANISM AND METHOD

[76] Inventor: Stanley E. Rose, 3216 E. Sweetwater, Phoenix, Ariz. 85032

[21] Appl. No.: 277,988

[22] Filed: Jun. 26, 1981

[51] Int. Cl.³ .............................................. B66C 1/00
[52] U.S. Cl. .................................. 414/739; 33/27 L; 74/18.1; 414/729
[58] Field of Search .................... 414/1, 2, 5, 6, 589, 414/590, 591, 680, 729, 735, 742, 739; 33/27 L; 251/127; 366/241; 74/18.1; 464/147, 150, 155, 904

[56] References Cited

U.S. PATENT DOCUMENTS 4,274,329  6/1981  Weyer ................................ 414/735
4,300,362 11/1981  Lande et al. ...................... 414/1 X

FOREIGN PATENT DOCUMENTS

573667 2/1958 Italy .

Primary Examiner—Joseph E. Valenza
Assistant Examiner—Donald W. Underwood
Attorney, Agent, or Firm—Cahill, Sutton & Thomas

[57] ABSTRACT

A spacial mechanism includes an arm having first and second spaced support points. The first and second support points are supported by first and second swivel bearings. The first and second swivel bearings are supported by first and second rotary elements that cause the first and second support points to travel through first and second circular paths. First and second independently controllable motors cause the first and second rotary elements to rotate at selected rates in selected directions. One end of the arm is caused to trace any predetermined pattern in a limited region by appropriately controlling the rotation of the first and second rotary elements. Analogous optical and fluid devices are also disclosed.

25 Claims, 16 Drawing Figures

FIG_3

FIG_5B

FIG_4

FIG_5A

FIG_5D

FIG_5G

FIG_5C

FIG_5E   FIG_5F

SPACIAL MECHANISM AND METHOD

BACKGROUND OF THE INVENTION

1. Field of the Invention

The invention relates to devices for producing controlled movement of a point or medium in space.

2. Description of the Prior Art

A variety of spacial mechanisms or devices for producing controlled motion of solid elements and light beams in space have been proposed. Numerous mechanical devices for controlling movement of mechanical elements have been proposed and are utilized in various types of robotic devices, commonly used in computer controlled manufacturing operations. These computer controlled machines tend to be expensive, bulky, and in some cases, lack adequate stability, speed, accuracy and reliability needed for many applications, especially if low cost is necessary. Various required motions in known devices are provided by means of a series of arms and pivot joints to provide the degrees of freedom needed for many robotic applications. The arm "stiffness" of the articulated arm members and the strength and positioning accuracy of such devices is determined by the number of and length of sequential extensions of articulated members from a main support frame. The strength and accuracy of such articulated arms tends to be further degraded with each successive arm and joint of such articulated structures, resulting in multiplication magnitudes of errors in positioning the ends of the arm. Typically, pneumatic or hydraulic actuators are utilized to produce pivoting of each arm member relative to the previous one, thereby limiting applications of the spacial mechanisms to those environments in which pneumatic or hydraulic power sources are available. Although the above disadvantages are not critical for many general applications in which relatively large extent of motion is required, smaller and more precise operations that often need to be performed by robotic devices require far greater precision than is capable of being attained at reasonable cost using prior articulated devices.

Accordingly, it is a primary object of the invention to provide an improved spacial mechanism and method which avoids the locational inaccuracies and weaknesses that result when articulated arm structures are utilized.

It is another object of the invention to provide a spacial mechanism and method which is relatively inexpensive and yet provides a high degree of precision, locational accuracy and reliability.

Previous spacial mechanisms typically have required a large number of computational steps to provide the control signals necessary to move a utilization point from one particular location to another described location.

Accordingly, another object of the invention is to provide a computer controlled spacial mechanism which requires a minimum number of computations to generate the control signals necessary to move a utilization point of the spacial mechanisms from one predetermined location to another predetermined location.

SUMMARY OF THE INVENTION

Briefly described and in accordance with one embodiment thereof, the invention provides a spacial mechanism and method for producing predetermined movements of first and second spaced points on an arm to cause predetermined spacial movement of a third point of the arm. In a described embodiment of the invention, the first and second points of the arm are supported by first and second swivel bearings which are supported by first and second circuit discs, respectively. The swivel bearings allow rotational movement of the first and second points of the arm and allow longitudinal movement of the arm relative to at least one of the circular discs. In the described embodiments of the invention, the first and second circular discs rotate in parallel planes, and are each peripherally rotatably supported by first and second groups of rollers or idlers that engage peripheral portions of the respective circular discs. The idlers of the first group are rotatably supported by a first wall and the idlers of the second group are rotatably supported by a second wall. The first and second circular discs are separately driven by means of first and second independently controllable electric motors, respectively. In one described embodiment of the invention, the idlers are rollers and each circular disc includes a pulley. First and second pulleys are driven by the first and second motors, respectively, and are coupled by belts to the respective pulleys of the first and second respective circular discs. In another embodiment of the invention, the first and second motors each drive a respective gear that engages peripheral teeth of respective ones of the first and second circular discs. The arm extends between the first and second discs. The third point lies on a portion of the arm beyond one of the circular discs. In operation, the directions of the motors and the rates of rotation thereof are selected to cause the third point to follow any predetermined path from one point to another within a predetermined annular volume. For example, if the two motors rotate in opposite directions exactly out of phase with each other, the third point traces a straight line, the direction of which can be varied by simultaneously varying the phases of the first and second motors by exactly the same amount. When the first and second motors rotate in the same direction at the same rate, the third point traces out a circle. If the relative phase between the first and second motors then is varied, the diameter of the circle traced by the third point varies accordingly, and the plane of the traced circle moves toward or away from the circular discs, depending on whether the phase angle between the first and second circular discs is increased or decreased. If the first and second circular discs rotate at different rates in the same direction, various other patterns are traced by the third point. In one described embodiment of the invention, the arm is longitudinally movable relative to the swivel bearings. A rack and pinion gear mechanism driven by a third motor moves in a way mechanism and is connected to a collar that engages the arm to control the longitudinal movement thereof. The arm includes an outer sleeve engaged by the collar and an inner sleeve rotatably disposed in the outer sleeve. The inner sleeve is rotated by a gear mechanism coupling the inner sleeve to a fourth motor. A mechanical manipulator is connected to one end portion of the inner sleeve, and is controlled in response to rotation of at least one shaft that extends through the inner sleeve and is connected to rotate in response to a fifth motor. An analogous optical device is disclosed wherein first and second optical wedges are independently controllable to rotate in parallel planes. A beam of light is received and refracted by the first rotating optical wedge. The refracted beam is received by and refracted by the second rotating optical wedge. By controlling the direction, rotation rate, and phase angles of the first and second optical wedges, the portion of the beam refracted by the second rotating optical wedge is caused to trace out any desired predetermined pattern on a target surface. In another embodiment of the invention, more than two rotatable optical wedges are arranged to produce additional refraction of the beam. In another embodiment of the invention, a beam of fluid is sequentially deflected by a plurality of independently rotatable louvered discs to produce predetermined movement of the finally deflected portion of the fluid beams.

In another embodiment of the invention, a predetermined motion is applied to the third point of the arm as a forced input. This causes the first and second circular disks, respectively, to act as output disks that now are respectively forced by the arm to undergo the same motions as they would have had to undergo to cause the third point of the arm to undergo the predetermined motion now being applied as a forced input.

DESCRIPTION OF THE INVENTION

Referring to the drawings, particularly FIGS. 1-4, spacial mechanism 1 includes four vertical walls 3A, 3B, 3C and 3D that form a box-like housing. Front wall 3B has a circular opening 25 therein, and rear wall 3D has a circular opening 27 therein. A plurality of rollers are attached to the outer surface of front wall 3B around the periphery of circular opening 25. A circular disc 5, hereinafter referred to as "input disc 5", is supported by the four rollers 29. Each one of rollers 29 has an inner and an outer circular flange that prevents input disc 5 from slipping sideways on that roller. A groove is disposed around the periphery of input disc 5 for receiving a timing belt 33. Timing belt 33 is driven by a pulley 37 connected by means of shaft 39 to electric stepping motor 41. Control signals for controlling the operation of stepping motor 41 are received from power/control circuit 53 by means of cable 51.

Figure 6:
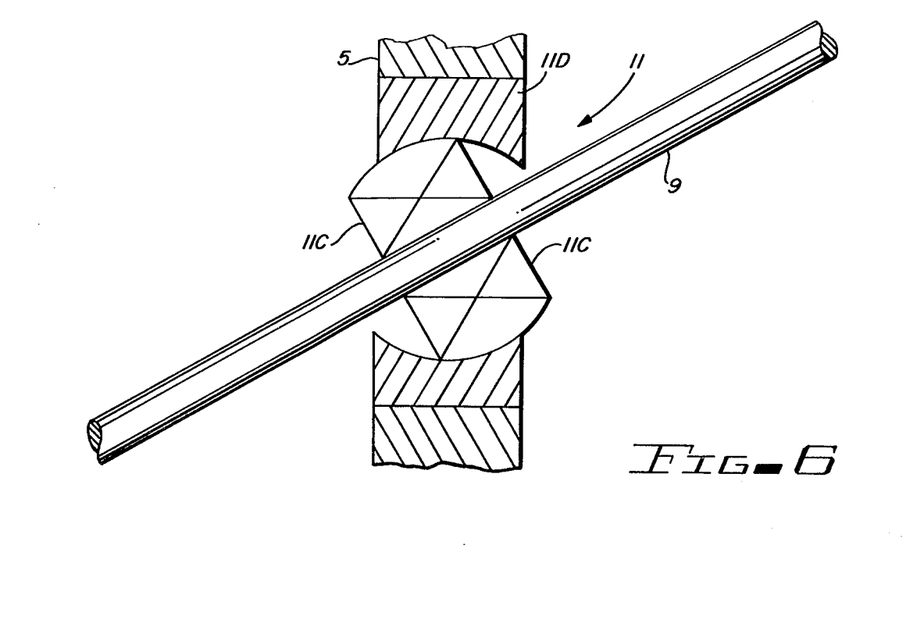
FIG. 6 is a schematic section view of one of the swivel bearings shown in the embodiments of FIG. 1.

Input disc 5 has a rectangular slot 13 that functions as a way member for slide block 15. A swivel bearing 11, shown in detail in FIG. 6, is supported on a member 11A that is rigidly attached to slide block 15. Tightening elements 15A lock slide block 15 in place after a suitable position has been selected for slide block 15 in way groove 13.

An input disc 7 that is entirely similar to input disc 5 is supported by rollers 31, which are attached to the outer surface of rear wall 3D. Input disc 7 has a way groove 17, a slide block 23, and a swivel bearing 19 attached by member 21 to slide block 23 in the same fashion as described with reference to input disc 5. Input disc 7 is driven by timing belt 35, which engages pulley 43. Pulley 43 is connected by shaft 45 to stepping motor 47. Stepping motor 47 is coupled by cable 49 to power/control circuit 53, which provides control signals. It can be seen that the control signals supplied to stepping motors 41 and 47 can be independent, so that the rotation rates, rotation directions, and phase angles of stepping motors 41 and 47 can be independently controlled.

Figures 3, 4, 5A, 5B, 5C, 5D, 5E, 5F, 5G:
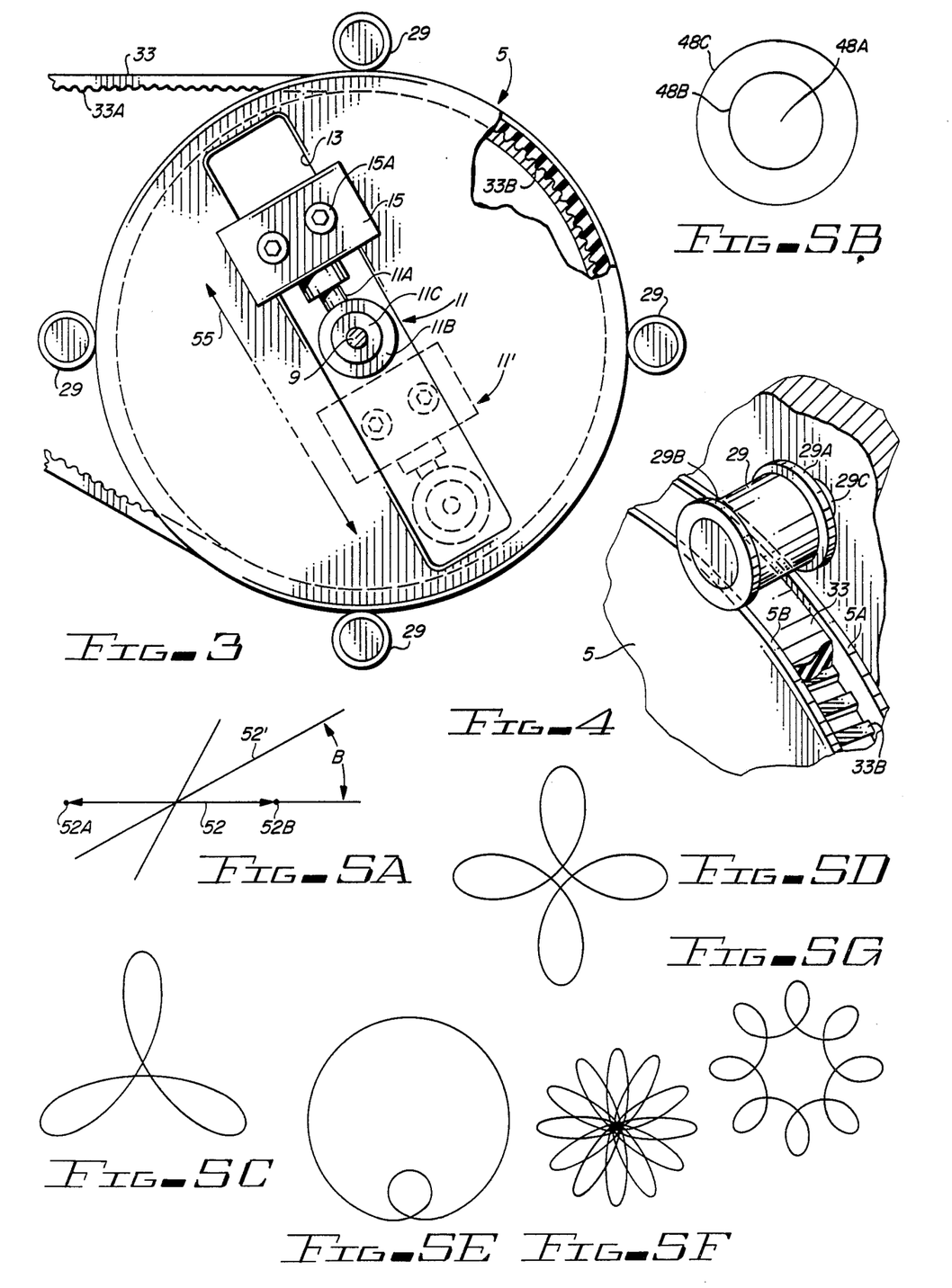
FIG. 3 is an enlarged plan view of a portion of the embodiment of FIG. 1.
FIG. 4 is a partial enlarged perspective view of a portion of the embodiment of FIG. 1.
FIGS. 5A-5G are diagrams of various patterns that can be traced out by point 9A of the embodiment of FIG. 1.

The details of input disc 5 are shown in more detail in FIG. 3, wherein it can be seen that the bottom of the peripheral groove around input disc 5 has teeth 33B. Teeth 33B engage teeth 33A, which are provided on the bottom of timing belt 33. Similar teeth are provided on the bottom of pulley 37, so that a fixed relationship is maintained between the phase of stepping motor 41 and the phase angle of input disc 5 by eliminating slippage between pulley 37, input disc 5 and timing belt 33, attaining accurate complete control of the phase angle of input disc 5. As shown in FIG. 3, when tightening elements 15A are loosened, the radial position of swivel bearing 11 can be adjusted in the directions by arrow 55 to select a suitable radius of the circle traced by the center of rod 9 at the point at which it passes through swivel bearing 11.

The configuration of rollers 29 and the peripheral portion of input disc 5 are shown more clearly in the enlarged view of FIG. 4, wherein it can be seen that the peripheral groove of input disc 5 is formed by two side flanges 5A and 5B, and that teeth 33B are disposed in the bottom of the groove. The above-mentioned side flanges of rollers 29 are designated by reference numerals 29A and 29B in FIG. 4. Roller 29 is rotatably connected to front wall 3B by means of a pin 29C. A suitable precision, low friction bearing (not shown) is provided to allow roller 29C to freely rotate on rigidly mounted pin 29C.

Figure 1:
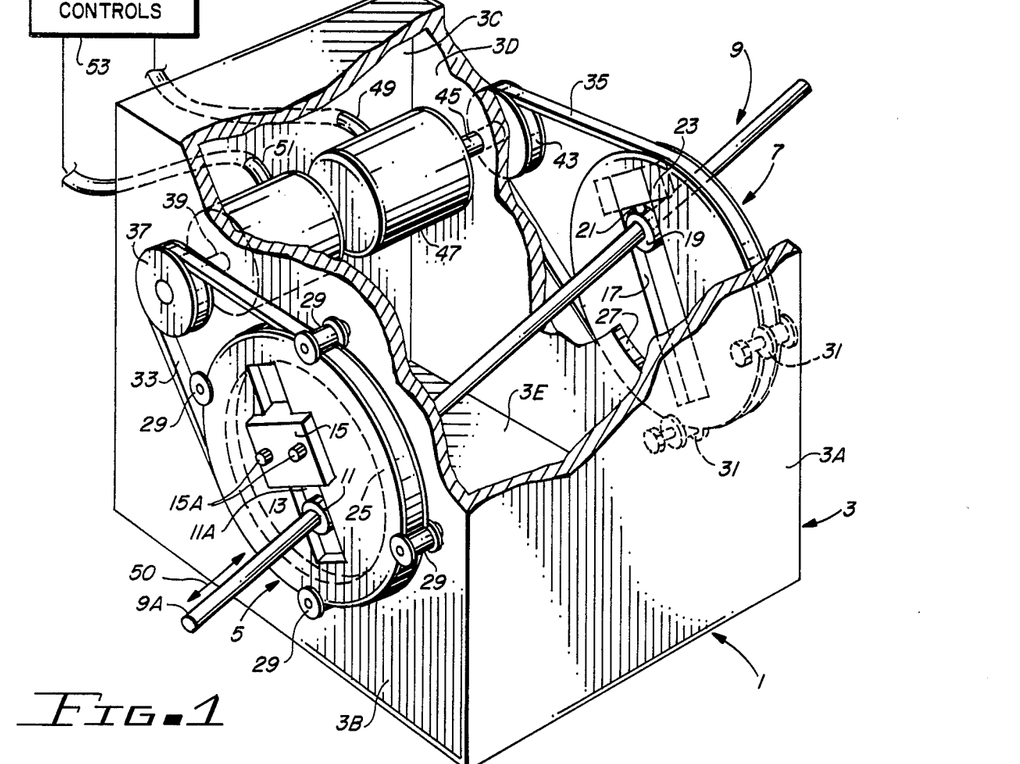
FIG. 1 is a partial cutaway prospective view of one embodiment of the invention.
Figure 2:
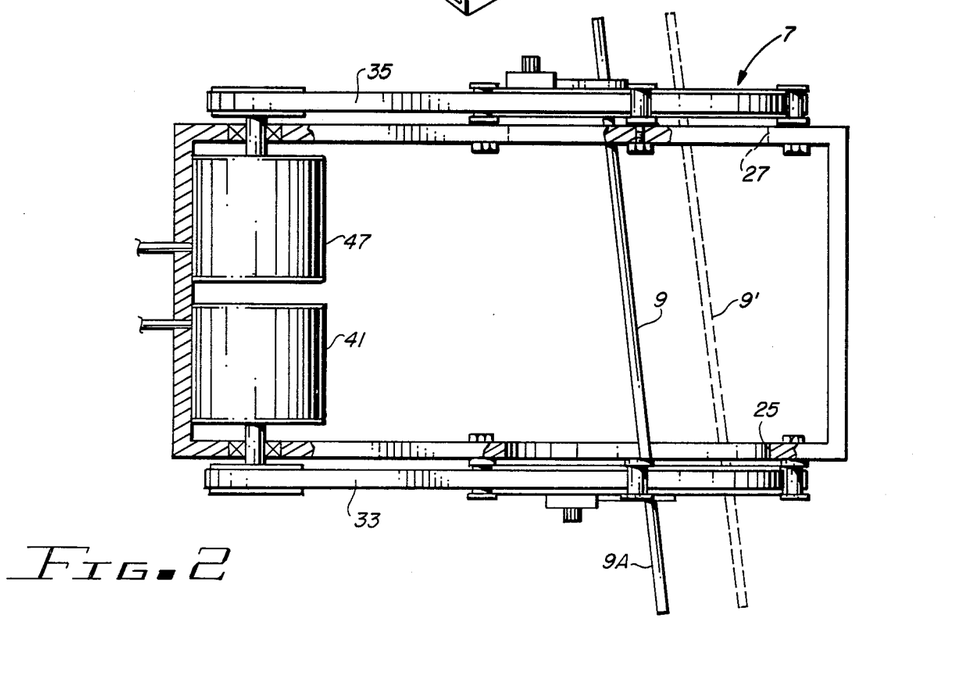
FIG. 2 is a partial cutaway top view of the embodiment of the invention shown in FIG. 1.

Referring now to FIGS. 1 and 2, it is seen that shaft or arm 9 extends through and is rotatably supported by swivel bearings 11 and 19. Rod 9 can also slide laterally in at least one of swivel bearings 11 and 19. For purposes of illustration, one end of rod 9 is designated by reference numeral 9A.

It can be seen that if the centers of swivel bearings 11 and 19 are positioned "off center" with respect to the axis of rotation of input discs 5 and 7, the respective points of rod 9 at which it is supported by swivel bearings 11 and 19, respectively, move in circular paths as stepping motors 41 and 47 cause rotation of input discs 5 and 7. As the relative phase angles of rotation of input discs 5 and 7 vary, and as their rates of rotation or angular velocity vary, and as the directions of rotation vary, one can see that a wide variety of patterns will be traced by end 9A of rod 9. For example, if stepping motors 41 and 47 are operated to cause input discs 5 and 7 to both rotate at the same angular velocity and in the same direction, point 9A will trace a circle. If the phase angles of both of input discs 5 and 7 are equal during the rotation, the diameter of the circle traced by point 9A will have a minimum value. As the phase angle of one of input discs 5 and 7 is varied from the phase angle of the other, the diameter of the circle traced by point 9A will increase. For example, in FIG. 5B, reference numerals 48A, 48B, and 48C represent circles traced by end point 9A as the phase angles of input discs 5 and 7 vary from zero degrees to a relatively large value.

As the phase angle between input discs 5 and 7 varies, end point 9A undergoes translation in the lateral directing (along the axis of the shaft 9) as indicated by reference numeral 50 in FIG. 1. To allow such translation, it is necessary that rod 9 be laterally slidable in swivel bearing 11 and laterally rigid with respect to swivel bearing 19.

If one imagines that input discs 5 and 7 are rotating at the same angular velocity, but in opposite directions, end point 9A will oscillate back and forth, tracing out a straight line, such as 52 in FIG. 5A, between end points 52A and 52B. As the phase angles of one of the input discs varies, the line rotates through an angle B, as indicated by reference numeral 52' in FIG. 5A.

If both input discs 5 and 7 rotate in the same direction, but one disc (i.e., input disc 7) rotates at a faster rate than input disc 5, a variety of patterns will be traced out. For example, the three leaf rose shown in FIG. 5C will be traced out at one ratio between the angular velocities of input discs 5 and 7. As the angular velocity of input disc 7 continues to increase, the three leaf rose will gradually evolve into the four leaf rose shown in FIG. 5D. FIGS. 5E, 5F, and 5G show a few of the infinite number of patterns that can be traced by point 9A as the respective angular velocities of input discs 5 and 7 are varied.

By now, the reader should be able to see that by providing appropriate control pulses to stepping motors 41 and 47, point 9A can be made to move to any point within a volume determined by the various dimensional parameters of spacial machine 1, including the radii of the paths traced out by swivel bearings 11 and 19, the spacing between parallel input discs 5 and 7, and the length of shaft 9. Discs 5 and 7 can be referred to as "input discs" because they receive input information that determines the position of point 9A.

Upon a bit of reflection, the reader can begin to appreciate that if the "input" discs are allowed to rotate freely, a particular "input movement" is forceably applied to free end 9A of rod 9, the freely rotatable input discs generally will be forced to rotate in precisely the same manner that they would rotate if they were providing the input motion necessary to generate the pattern now being provided as a forced input to point 9A. For example, discs 5 and 7 are allowed to rotate freely, and a circular motion is forceably applied to point 9A by a suitable driving mechanism, then disc 5 will be forced to rotate at the same angular velocity as "forced input" point 9A, and the phase angle between discs 5 and 7 will be determined by the radius of the circular driving path forced upon point 9A. If, as another example, the driving pattern applied to point 9A is the pattern shown in FIG. C, then disc 5 will be forced to rotate at a different angular velocity than disc 7.

Thus, it can be seen that the spacial mechanism shown in FIG. 1 can be utilized to convert various kinds of rotary motion into various linear, rotary, or non-linear types of motion. The spacial mechanism also can be used to convert linear or non-linear or rotary motions.

Figure 7:
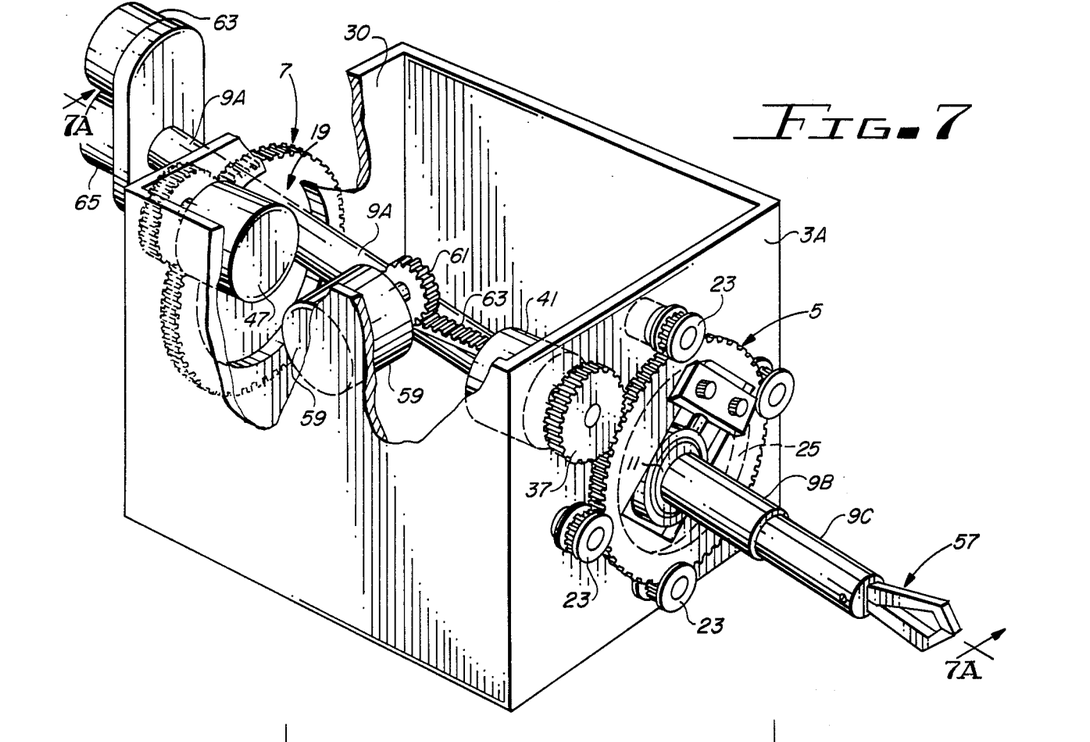
FIG. 7 is a partial cutaway perspective view of another embodiment of the invention.
Figure 7A:
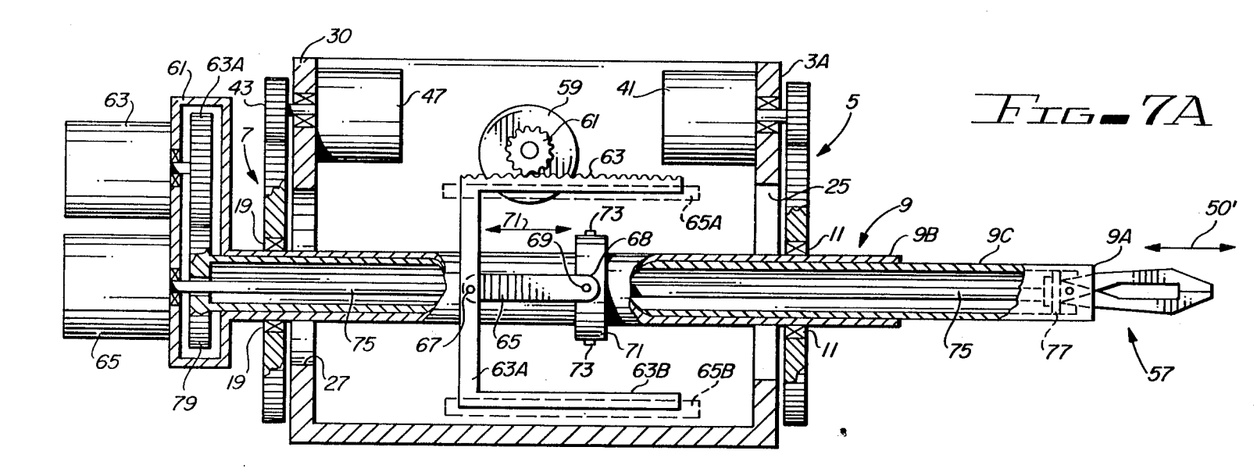
FIG. 7A is a partial cutaway section view taken along section line 7A of FIG. 7.

At this point, it is helpful to illustrate how additional degrees of freedom can be added to the types of spacial motion that can be produced using the basic mechanism shown in FIG. 1. Referring now to FIGS. 7 and 7A, wherein the same reference numerals are used as in FIG. 1 to designate like or identical parts, input discs 5 and 7 are gears, and rollers 29 and 31 (FIG. 1) are provided with gear teeth to mate with the teeth of input discs 5 and 7. Shaft 9 of FIG. 1 has been replaced with shaft member 9 in FIG. 7. Shaft member 9 in FIGS. 7 and 7A includes an outer sleeve section 9A and an inner sleeve section 9B that is rotatable relative to sleeve 9A. The swivel bearing arrangement shown in FIG. 1 is utilized in FIG. 7, and is designated by reference numerals 11 and 19 in FIGS. 7A.

Stepping motor 41 drives a gear 37 having peripheral teeth that engage the peripheral teeth of disc 5. Similarly, stepping motor 47 drives a gear 43 which engages the peripheral teeth of disc 7. Translation of the shaft member 9 in FIG. 7 in the directions indicated by arrow 50' in FIG. 7A can be accomplished not only by changing the phase between input discs 5 and 7, as previously explained with reference to FIG. 1, but can also be achieved by applying appropriate controls to stepping motor 59, which drives a pinion gear 61. Pinion gear 61 engages a rack gear 63. Rack gear 63 is disposed slidably in a way member 65A. Rack 63 is rigidly attached to way member 63A. Member 63A is attached to a horizontal member 63B. Member 63B is parallel to rack gear 63 and slides in a way member 65B. An arm 65 is pivotally connected at its ends by pins 67 and 68 to members 63A and collar 71, respectively. Collar 71 engages outer sleeve 9D by means of pins 73. Thus, it can be seen that as stepping motor 59 rotates gear 61, rack gear moves in the directions indicated by arrow 71, and arm 65 translates this motion to sleeve 9, causing the primary concept of motion in the directions indicated by arrow 50'.

As shown in FIGS. 7 and 7A, a pair of jaws 57 are attached to the end 9B of shaft member 9. A screw gear mechanism causes jaws 57 to open or close in response to rotation of a screw shaft 75. Screw shaft 75 extends through inner shaft member 9C and is driven by stepping motor 65.

Inner shaft member 9C is connected to gear 79, which in turn is driven by gear 63A. Gear 63A is driven by stepping motor 63. Thus, the device shown in FIGS. 7 and 7A can be used as a robotic device having more degrees of freedom than the device shown in FIG. 1, wherein additional flexibility in causing movement in the directions of arrows 50' (FIG. 7A) is achieved by control of stepping motor 59, rotation of jaws 57 is achieved by control of stepping motor 63, and opening and closing of jaws 57 is attained by controlling stepping motor 65.

It can be readily seen that numerous other variations of the device shown in FIG. 7A can be provided. For example, additional screw shafts and stepping motors driving them could be provided extending through inner shaft member 9C to control more complex clamping or gripping mechanisms and the like.

It should further be appreciated that although only one shaft 9 is shown in the disclosed embodiments of the invention, more than one shaft can extend through inputs discs 5 and 7, as indicated by dotted lines 9' in FIG. 2. In some instances, this can be a very useful variation of the invention, because the end points of the shaft can be made to move close together or spread out from each other by merely varying the phase angle between the input discs 5 and 7, assuming they are rotating at the same angular velocity. This can facilitate actuation of various robotic mechanisms with a very simple computation to change phase between the input discs.

The above-identified embodiments of the invention can be adapted to many applications, including material handling, assembly, plotting, probing, testing, machining, electrical discharge milling, tool holding, manual positioning, pick up, and placement robotic mechanisms and many others. Many advantages are achievable with the basic mechanisms shown in the embodiments of the invention of FIGS. 1 and 7. The basic mechanism disclosed lends itself to low cost, accurate incremental control applications with excellent stability, smooth, low vibration operation, low noise, and very high strength, especially in the "z" direction. The device is capable of providing very high speed operation with excellent reliability and long life characteristics. The disclosed device is inherently capable of generating a very broad range of motions, with polar coordinate motions being most easily generated (and provides relatively convenient adjustment of operating parameters while the mechanism is operating.) For example, the diameter of a circle can be easily changed by a very simple (from a computational point of view) change in the phase angle between input discs 7 and 5. Similarly, a simple change in the phase angle between discs 5 and 7 can modify the angular orientation of a straight line. Many complex motions can be obtained from simple control signals applied to stepping motors 41 and 47. Furthermore, in many robotic applications, the manipulating mechanisms located at the end of shaft 9 are located a substantial distance away from the region in which input motion is provided, allowing good accessibility and visibility of the entire device and convenient maintenance thereof. Although the motors designated in the described embodiments of the invention are stepping motors, numerous other input power elements including pneumatic, hydraulic, and linear motors can be provided.

Figure 8:
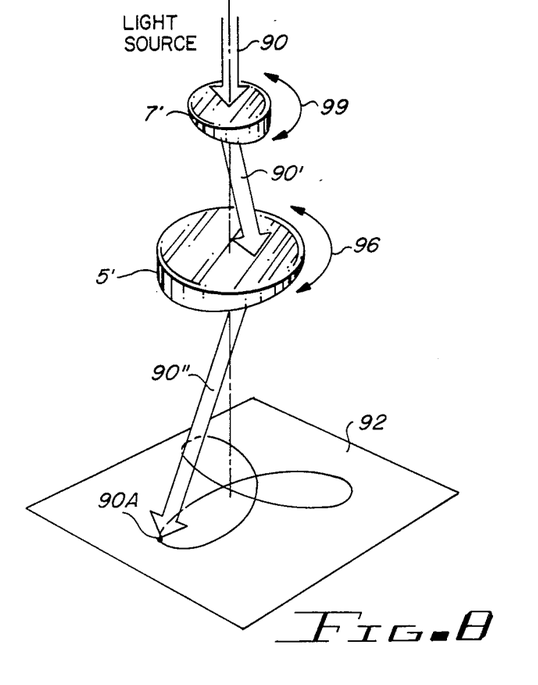
FIG. 8 is a schematic perspective diagram useful in describing an optical device that is mathematically analogous to the device of FIG. 1.

Furthermore, the type of motion imparted to shaft 9 and end point 9A thereof can be provided by mathematically analogous optical and fluid embodiments of the invention. For example, in FIG. 8, a beam of light can be utilized as the communicating medium, instead of shaft 9. In FIG. 8, reference numeral 90 represents a beam received by rotating optical wedge 7'. As is well known, an optical wedge causes refraction of a beam. Hence, beam 90' will rotate at the same rate that optical wedge 7' rotates. A larger optical wedge 5' rotates in the direction indicated by arrow 96. Deflected beam 90' is further refracted by rotating optical wedge 5' which, in effect, mathematically adds the effect of its motion to produce doubly refracted beam 90". Optical wedges 7' and 5' can be mounted on suitably modified input discs, such as input disc 5 and input disc 7 shown in the previously described embodiments of the invention. The end of deflected beam 90" traces out a pattern on a target plane or surface, such as 92. Upon a bit of analysis, it can easily be seen that the pattern traced out by end 90A of deflected beam 90" is the same as the pattern traced by point 9A of rod 9 in FIG. 1 if the input motions applied to optical wedges 7' and 5' are the same as those applied to input discs 5 and 7, respectively.

The concept shown with reference to FIG. 8 for mathematically added motions imparted to a light beam can be implemented utilizing very small optical wedges which rotate at extremely high rates of speed. A large variety of optical scanning, printing, copying, "painting", and photographic applications of the device can be envisioned.

Figure 9:
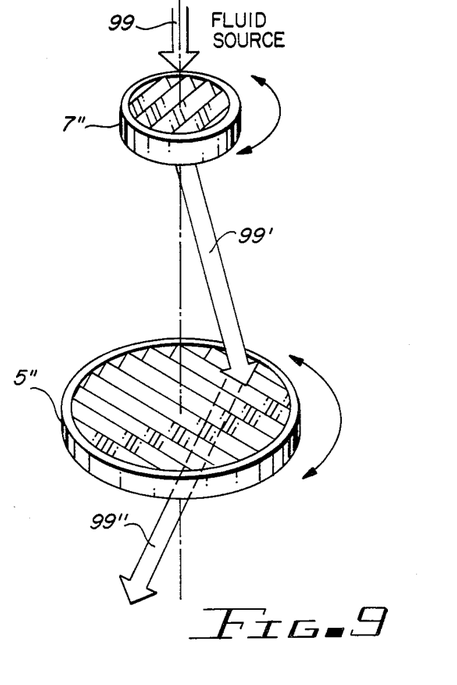
FIG. 9 is a schematic perspective diagram useful in describing a fluid device that is mathematically analogous to the device of FIG. 1.

The same principles discussed with reference to FIG. 8 apply to other types of beams than light beams. For example, in FIG. 9, a "fluid beam" 99 is deflected by suitable louvres disposed in rotating disc 7", to produce deflected fluid beam 99'. Deflected beam 99' is received by a second larger rotating disc 5" also having louvres therein to produce beam 99". Assuming that the velocity of the fluid beam is very large relative to the velocity of any point on either of rotating discs 7" and 5", the movement of a point of impingement of beam 99" on a flat target will have the same general configuration as the pattern traced out by point 9A of shaft 9 (FIG. 1), assuming that the relationship between the rotary motions of discs 7" and 5" is the same as that for input discs 7 and 5 of the embodiment of FIG. 1.

Control block 53 can be implemented in numerous ways by those skilled in the art. For example, single manual controls that cause applying of control pulses to stepping motors such as 41 and 47 of FIG. 1 and 61, 63 and 65 of FIG. 7 can be used, or a programmed digital computer system can be provided to generate the necessary control pulses to the respective stepping motors to cause a predetermined movement of the end of rod 9 and the manipulator 57 (FIG. 7) thereon. One very simple, yet effective way of producing automatic operation of the disclosed devices is to use a Model 8138 TASKMASTER programmable numerical control machine available from Summit/Dana Corporation of Bozeman, Montana. This device has the capability of executing stored routines to generate the pulses for the stepping motors. The desired programs can be automatically created and stored in the memory of an internal computer by operating the device in a "jog" mode, wherein selected input keys are sequentially pressed to cause the numerical control machines to generate one stepping motor pulse at a time. For example, the "X" key can be used to "jog" stepping motor 47 clockwise or counterclockwise, one pulse at a time, the "Y" key can be used to "jog" stepping motor 41 clockwise or counterclockwise, one pulse at a time, and the "Z" key can be used to "jog" stepping motor 59 (FIG. 7) one pulse at a time to control the "Z" position of rod 9. The user can simply manually "jog" the spacial mechanism so that the end of rod 9 slowly moves through the desired pattern. A program to cause the sequence to be repeated at high speed in response to an appropriate command is automatically created by the TASKMASTER machine, and is stored therein, if desired.

While the invention has been described with reference to several particular embodiments thereof, those skilled in the art will be able to make various modifications to the described embodiments of the invention and to substitute various elements and steps equivalent to those described herein without departing from the true spirit and scope of the invention. For example, it is not necessary that the means for supporting the swivel bearings 11 and 19 be rotary, and hence can trace out noncircular paths, if suitable drive mechanisms are provided. It should be noted that the spacial mechanisms referred to above can be cascaded in order to provide additional control of the movement of the beams shown in FIGS. 8 and 9. For example, in FIG. 8, one or more additional rotary optical wedges could be positioned between optical wedge 5' and surface 92 to provide further control of the deflection of the light beam shown. The mechanical embodiments of the invention, such as those shown in FIGS. 1 and 7, also can be cascaded. For example, the motion of end 9A of rod 9 of spacial mechanism shown in FIG. 1 can be coupled to produce the rotation of a disk 7 of another similar spacial mechanism that omits motor 47. Numerous uses of the disclosed embodiments other than those suggested above can be readily envisioned, including uses in which motion of the end point 9A of rod 9 is a forced input, and the motions of the disks 5 and 7 are used as outputs.

I claim:

1. A device for producing controlled spacial movement of a first point, said device comprising in combination:
   (a) an arm having first and second spaced support portions, said first point being located on said arm;
   (b) first swivel bearing means for supporting said arm at said first support portion;
   (c) second swivel bearing means for supporting said arm at said second support portion;
   (d) first rotary means supporting said first swivel bearing means for causing said first support portion to move along a first circular path, said first rotary means including a first circular disc and a plurality of first idler means peripherally engaging said first circular disc to rotatably support said first circular disc;
   (e) second rotary means supporting said second swivel bearing means for causing said second support portion to move along a second circular path, said arm having a longitudinal axis that always extends through said first and second circular paths, said second rotary means including a plurality of second idler means peripherally engaging said second circular disc to rotatably support said second circular disc in a fixed relationship with said first circular disc;
   (f) first means for causing said first rotary means to rotate at a first rate; and
   (g) second means for causing said second rotary means to rotate at a second rate.

2. The device of claim 1 wherein said first means includes a first electric motor and said second means includes a second electric motor.

3. The device of claim 2 wherein said first rotary means is coupled to said first electric motor by means of a timing belt and two pulleys that engage the teeth of said timing belt.

4. The device of claim 2 wherein said first rotary means is coupled to said first electric motor by means of first and second gears.

5. The device of claim 1 wherein said first and second circular discs are parallel.

6. The device of claim 1 wherein said arm is laterally movable with respect to said first swivel bearing means.

7. The device of claim 2 further including control means for effecting independent controlling of the directions of rotation, angular velocities, and phases of rotation of said first and second motors.

8. The device of claim 1 further including means for adjusting the radii of said first and second circular paths.

9. The device of claim 1 further including means for laterally sliding said arm relative to said first and second swivel bearing means to control the lateral displacement of said first point in the direction of a longitudinal axis of said arm.

10. The device of claim 1 further including means for rotating said arm in said first and second swivel bearing means.

11. The device of claim 1 further including manipulating means disposed on said first end portion of said arm for manipulating or performing an operation on a work piece.

12. The device of claim 11 further including a shaft extending from one end portion of said arm to another end portion of said arm for communicating with said manipulating means to effect operation of said manipulating means.

13. The device of claim 12 including a motor coupled to said shaft for causing rotation of said shaft to effect said operation of said manipulating means.

14. The device of claim 2 wherein said first and second electric motors are stepping motors.

15. A device for producing controlled spacial movement of a first point thereof to which a utilization apparatus is connected in order to effectuate controlled spacial movement of said utilization apparatus, said device comprising in combination:
   (a) an arm having first and second spaced support portions thereof, said first point being on said arm, said arm being not articulated;
   (b) first swivel bearing means for supporting said arm at said first support portion;
   (c) second swivel bearing means for supporting said arm at said second support portion;
   (d) first means supporting said first swivel bearing means for moving said first support portion of said arm along a first predetermined path; and
   (e) second means exclusive of and non-responsive to said first means and supporting said second swivel bearing means for moving said second support portion of said arm along a second predetermined path, said arm having a longitudinal axis that always passes through said first and second paths to effectuate movement of said first point of said arm anywhere within a predetermined volume of space.

16. The device of claim 15 wherein said first means includes first propelling means for moving said first swivel bearing means independently of movement of said second swivel bearing means.

17. The device of claim 16 wherein said second means includes second propelling means for moving said second swivel bearing means independently of movement of said first swivel bearing means.

18. The device of claim 7 wherein a portion of said arm extends beyond a side of said first means opposite to said second means.

19. The device of claim 17 wherein said first propelling means causes said first support portion of said arm to move along said first predetermined path at a different velocity than said second support portion of said arm moves along said second predetermined path.

20. The device of claim 17 wherein said first and second predetermined paths are circular.

21. A device for producing controlled spacial movement of a first point, said device comprising in combination:
   (a) an arm having first and second spaced support portions, said first point being located on said arm;
   (b) first swivel bearing means for supporting said arm at said first support portion;

(c) second swivel bearing means for supporting said arm at said second support portion;
(d) first rotary means supporting said first swivel bearing means for causing said first support portion to move along a first circular path;
(e) second rotary means supporting said second swivel bearing means for causing said second support portion to move along a second circular path, said arm having a longitudinal axis that always extends through said first and second circular paths;
(f) first means for causing said first rotary means to rotate at a first rate, said first means including an electric motor, a timing belt, a first pulley connected to said electric motor, and a second pulley connected to said first rotary means, said first and second pulleys engaging teeth of said timing belt; and
(g) second means for causing said second rotary means to rotate at a second rate.

22. A device for producing controlled spacial movement of a first point, said device comprising in combination:
(a) an arm having first and second spaced support portions, said first point being located on said arm;
(b) first swivel bearing means for supporting said arm at said first support portion;
(c) second swivel bearing means for supporting said arm at said second support portion;
(d) first rotary means supporting said first swivel bearing means for causing said first support portion to move along a first circular path;
(e) second rotary means supporting said second swivel bearing means for causing said second support portion to move along a second circular path, said arm having a longitudinal axis that always extends through said first and second circular paths;
(f) first means for causing said first rotary means to rotate at a first rate;
(g) second means for causing said second rotary means to rotate at a second rate, and
(h) means for adjusting the radii of said first and second circular paths.

23. A device for producing controlled spacial movement of a first point, said device comprising in combination:
(a) an arm having first and second spaced support portions, said first point being located on said arm;
(b) first swivel bearing means for supporting said arm at said first support portion;
(c) second swivel bearing means for supporting said arm at said second support portion;
(d) first rotary means supporting said first swivel bearing means for causing said first support portion to move along a first circular path;
(e) second rotary means supporting said second swivel bearing means for causing said second support portion to move along a second circular path, said arm having a longitudinal axis that always extends through said first and second circular paths;
(f) first means for causing said first rotary means to rotate at a first rate;
(g) second means for causing said second rotary means to rotate at a second rate; and
(h) means for laterally sliding said arm relative to said first swivel bearing means to control the lateral displacement of said first point in the direction of a longitudinal axis of said arm.

24. A device for producing controlled spacial movement of a first point, said device comprising in combination:
(a) an arm having first and second spaced support portions, said first point being located on said arm;
(b) first swivel bearing means for supporting said arm at said first support portion;
(c) second swivel bearing means for supporting said arm at said second support portion;
(d) first rotary means supporting said first swivel bearing means for causing said first support portion to move along a first circular path;
(e) second rotary means supporting said second swivel bearing means for causing said second support portion to move along a second circular path, said arm having a longitudinal axis that always extends through said first and second circular paths;
(f) first means for causing said first rotary means to rotate at a first rate;
(g) second means for causing said second rotary means to rotate at a second rate;
(h) manipulating means disposed on said arm at said first point thereof for manipulating or performing on operation; and
(i) shaft means extending from said first point of said arm to a portion of said arm spaced from said first point for communicating with said manipulating means to effect operation of said manipulating means.

25. A device for producing controlled spacial movement of a first point, said device comprising in combination:
(a) an arm having first and second spaced support portions, said first point being located on said arm;
(b) first swivel bearing means for supporting said arm at said first support portion;
(c) second swivel bearing means for supporting said arm at said second support portion;
(d) first rotary means supporting said first swivel bearing means for causing said first support portion to move along a first circular path, said first rotary means including a first circular disc and first means peripherally engaging said first circular disc to rotatably support said first circular disc;
(e) second rotary means supporting said second swivel bearing means for causing said second support portion to move along a second circular path, said arm having a longitudinal axis that always extends through said first and second circular paths, said second rotary means including second means peripherally engaging said second circular disc to rotatably support said second circular disc in a fixed relationship with said first circular disc;
(f) first means for causing said first rotary means to rotate at a first rate; and
(g) second means for causing said second rotary means to rotate at a second rate.

* * * * *